(12) United States Patent
Kuhn

(10) Patent No.: US 6,273,685 B1
(45) Date of Patent: Aug. 14, 2001

(54) THRUST PLATE RETAINING DEVICE FOR RADIAL PISTON PUMPS

(75) Inventor: Uwe Kuhn, Riederich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/452,717

(22) Filed: Dec. 3, 1999

(30) Foreign Application Priority Data

Dec. 7, 1998 (DE) ................................. 198 56 351

(51) Int. Cl.[7] .............. F04B 1/04; F16C 33/18; F16C 17/04
(52) U.S. Cl. .................. 417/273; 384/298; 384/420; 384/903
(58) Field of Search .................. 417/273, 470; 384/298, 420, 903

(56) References Cited

U.S. PATENT DOCUMENTS

| | | | |
|---|---|---|---|
| 4,006,659 | * | 2/1977 | Wurzel et al. ................. 85/8.8 |
| 4,310,205 | * | 1/1982 | Condon, Jr. et al. ........... 308/135 |
| 4,364,615 | * | 12/1982 | Euler ........................... 308/236 |
| 4,770,547 | * | 9/1988 | New ............................ 384/429 |
| 4,907,899 | * | 3/1990 | Rhoads ........................ 384/620 |
| 4,924,127 | * | 5/1990 | Boireau ........................ 310/90 |
| 5,007,746 | * | 4/1991 | Matzelle et al. ............... 384/420 |
| 5,139,350 | * | 8/1992 | Gieseler et al. ............... 384/420 |
| 5,505,548 | * | 4/1996 | Stewart ........................ 384/537 |
| 5,529,399 | * | 6/1996 | Holze .......................... 384/107 |
| 5,564,838 | * | 10/1996 | Caillault et al. .............. 384/448 |
| 5,630,708 | * | 5/1997 | Kushida et al. ................ 417/273 |

* cited by examiner

Primary Examiner—Timothy S. Thorpe
Assistant Examiner—Timothy P. Solak
(74) Attorney, Agent, or Firm—Ronald E. Greigg; Edwin E. Greigg

(57) ABSTRACT

A radial piston pump for generating high-fuel pressure in fuel injection systems of internal combustion engines, in particular in a common rail injection system, having a drive shaft which is supported in a pump housing and has an eccentrically embodied shaft portion on which preferably a plurality of pistons, disposed radially in a respective element bore are supported relative to the drive shaft. The pistons move back and forth in the respective element bore by rotation of the drive shaft. An axial bearing disk with a plurality of lugs which are disposed on the circumference and engage corresponding grooves in the pump housing is mounted in the pump housing with the aid of a retaining device.

20 Claims, 5 Drawing Sheets

THRUST PLATE RETAINING DEVICE FOR RADIAL PISTON PUMPS

BACKGROUND OF THE INVENTION

The invention relates to a radial piston pump for generating high-fuel pressure in fuel injection systems of internal combustion engines, in particular in a common rail injection system, having a drive shaft which is supported in a pump housing. The drive shaft has an eccentrically embodied shaft portion on which preferably a plurality of pistons, disposed radially in a respective element bore are supported relative to the drive shaft, which pistons can be moved back and forth in the respective element bore by rotation of the drive shaft.

One such radial piston pump is known for instance from German Patent Disclosure DE 42 16 877. When helical gear wheels are used, the drive of the radial piston pump produces axial forces, which can be absorbed by an axial bearing disk provided with a slide bearing material. The axial bearing disk is centered in the housing and can be secured against rotation by means of two circumferential lugs that engage grooves in the pump housing. Depending on the mounting concept, it can happen that half of the pump housing has to be installed overhead with the axial bearing disk in place. In this case, it is necessary for the axial bearing disk to be fixed in its position, to prevent the bearing disk from falling out of the centering. The fixation of the axial bearing disk can be attained for instance by means of one or more supports. Attaching one or more supports, however, dictates one additional work step in assembly. Additional aids are also necessary. There is furthermore the risk that attaching the supports damage the axial bearing disk.

OBJECT AND SUMMARY OF THE INVENTION

The object of the invention is to enable fixing an axial bearing disk and the pump housing in such a way that assembly becomes simper. In particular, damage to the axial bearing disk during assembly is to be avoided.

A radial piston pump for generating high-fuel pressure in fuel injection systems of internal combustion engines, in particular in a common rail injection system. The piston pump includes a drive shaft which is supported in a pump housing and has an eccentrically embodied shaft portion on which preferably a plurality of pistons, disposed radially in a respective element bore are supported relative to the drive shaft. The pistons can be moved back and forth in the respective element bore by rotation of the drive shaft. This object is attained in that an axial bearing disk with a plurality of lugs which are disposed on the circumference and engage corresponding recesses in the pump housing is mounted in the pump housing with the aid of a retaining device. The retaining device serves to hold the axial bearing disk firmly in the pump housing, and it remains in the pump housing even after assembly.

A particular embodiment of the invention is characterized in that an annular groove is recessed in the pump housing and serves to receive a retaining ring that forms the retaining device; clamp-like protrusions are formed on this ring that fit around the lugs on the retaining ring. The annular groove serves to fix the retaining ring in the pump housing. The pump housing may either be closed, i.e. form an uninterrupted outline, or be slit in the manner of a snap ring.

A further particular feature of the invention is characterized in that the retaining device is formed by a plurality of clips fitting around the lugs, the bent ends of each clip being inserted into corresponding bores in the pump housing. In the installed state, the clips grip the lugs and thus hold them firmly in the pump housing. For this purpose, one clip would in principle suffice. Preferably, however, two or more clips are used. It is understood that there must be at least as many lugs as there are clips or clamp-like protrusions.

A further particular feature of the invention is characterized in that the bent ends of the clips have a different spacing from one another than the corresponding bores in the pump housing. As a result, it is attained that in the built-in state, the bent ends of the clips are prestressed. This prevents the clips from sliding out of the pump housing after assembly.

A further particular feature of the invention is characterized in that the retaining device is formed by a retaining disk, from whose circumference a plurality of claws are bent, which claws can dig into the pump housing when the axial bearing disk is disposed between the retaining disk and the pump housing. In this version, it is possible for the axial bearing disk to have a special external shape, such as that of a hexagon or octagon. The number of claws of the retaining disk can be adapted to the number of lugs of the axial bearing disk.

A further particular feature of the invention is characterized in that an annular groove, which is engaged by the claws bent from the retaining disk, is embodied in the pump housing. Instead, recesses can also be made in the pump housing. However, the annular groove offers the advantage of simplifying the mounting of the retaining disk.

A further particular feature of the invention is characterized in that the retaining device is formed of an elastic material, in particular spring steel. This feature offers the advantage that the retaining device can be clipped onto the pump housing in a simple way. That is, the assembly of the axial bearing disk and the retaining device can be done by hand, without using additional tools. The assembly process can also be automated, so that large numbers can be put together in a short time.

A further particular feature of the invention is characterized in that a plurality of radially extending lubricating grooves are recessed in the axial bearing disk. The lubricating grooves in the axial bearing disk make it possible for lubricant to pass out of the pump housing to the bearing running face.

A further particular feature of the invention is characterized in that the inside diameter of the pump housing in the region of the retaining devices is selected such that loosening of the retaining device is prevented. This means in detail that the clamp-like protrusions or claws are prevented from emerging from the annular groove, or the clips are prevented from emerging from the bores. In other words, the retaining device can be said to be self-securing.

Further advantages, characteristics and details of the invention will become apparent from the ensuing description, in which various exemplary embodiments of the invention are described in detail in conjunction with the drawings. The characteristics recited in the claims and mentioned in the description can each be essential to the invention individually or in arbitrary combination.

DESCRIPTION OF THE PREFERRED EMBODIMENTS

Figure 1:
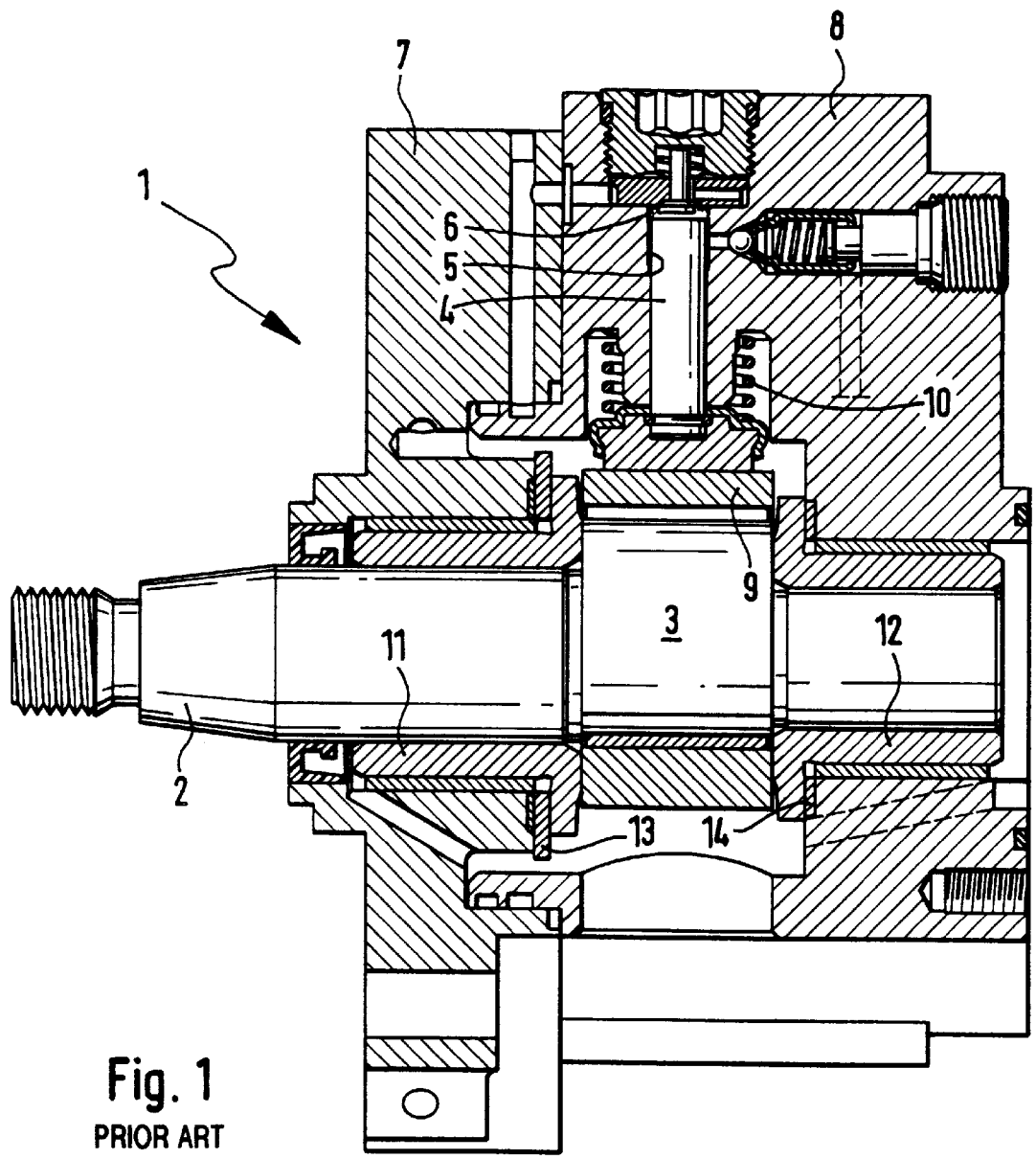
FIG. 1 shows a radial piston pump in section.

The radial piston pump shown in section in FIG. 1 is used in particular in common rail injection systems, to supply fuel to diesel engines. The term "common rail" means the equivalent of "common line". In contrast to conventional high-pressure injection systems, in which the fuel is pumped to the individual combustion chambers over separate lines, in common rail injection systems the injection nozzles are supplied from a common line.

The radial piston pump identified overall by reference numeral 1 in FIG. 1 includes a drive shaft 2, supported in a pump housing 7, 8, with an eccentrically embodied shaft portion 3. A ring 9 relative to which the shaft portion 3 is rotatable is provided on the eccentrically embodied shaft portion 3. The ring 9 includes three flat faces, offset from one another by 120° each, against each of which one piston is supported; in the section shown in FIG. 1, only one piston 4 can be seen. The piston 4 is received in an element bore 5, radially to the drive shaft 2, in such a way that it can reciprocate, and it defines a cylinder chamber 6.

The radial piston pump 1 shown in FIG. 1 serves to impose high pressure on fuel that is furnished from a tank by a pre-feed pump. The fuel at high pressure is then pumped into the aforementioned common line. In the supply stroke, the pistons 4 are moved away from the axis of the drive shaft 2 as a consequence of the eccentric motion of the ring 9. In the intake stroke, the pistons 4, supported by a spring 10, move toward the axis of the drive shaft, in order to aspirate fuel into the cylinder chambers 6.

The drive shaft 2 is supported slidingly, both radially and axially, in the pump housing 8 with the aid of flanged bushes 11 and 12. The axial support is assured by axial bearing disks 13 and 14.

Figure 2:
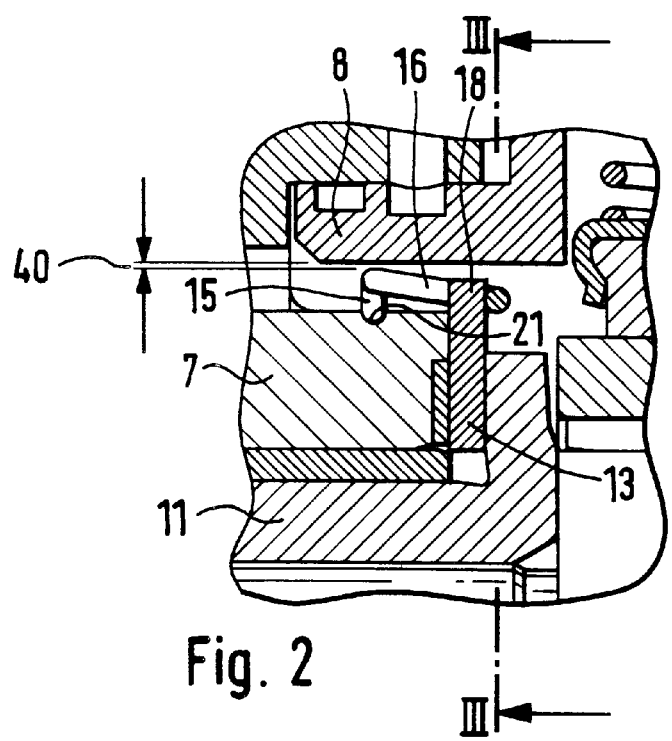
FIG. 2 shows an enlarged detail of FIG. 1 in accordance with a first embodiment of the present invention.

As can be seen in the enlarged detail shown in FIG. 2, the axial bearing disk 13, after being installed and before the flange bush 11 and the drive shaft 2 are built in, is held in position with the aid of a retaining ring 15. Two clamp-like protrusions 16 and 17 are embodied on the retaining ring 15; of them, only the protrusion 16 is visible in the detail shown in FIG. 2.

Figure 3:
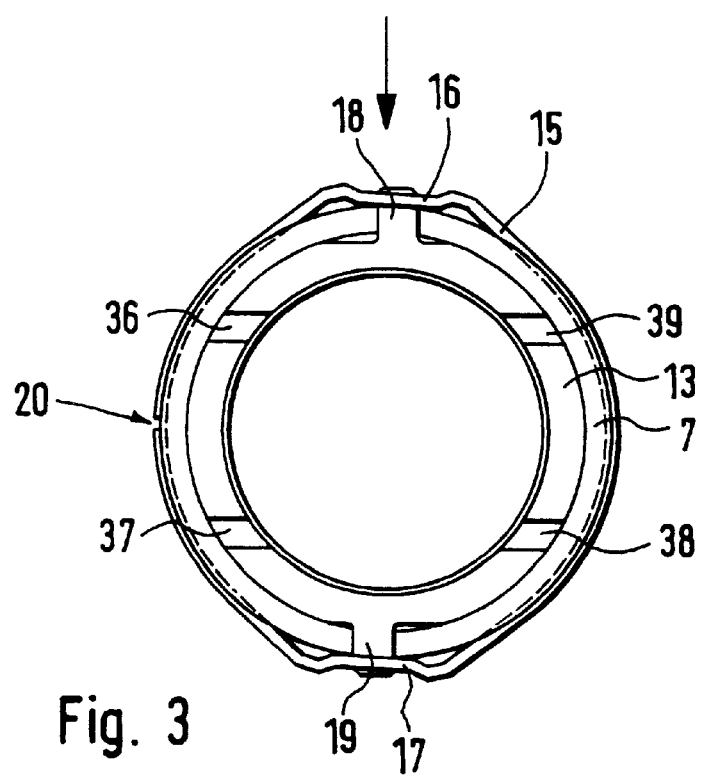
FIG. 3 shows a section taken along the line III—III in FIG. 2.

In the section III—III shown in FIG. 3, for the sake of simplicity only the axial bearing disk 13, the housing part 7 and the retaining ring 15 are shown. As seen from FIG. 3, two lugs 18 and 19 are formed on the axial bearing disk 13. The lugs 18 and 19 are gripped by the clamp-like protrusions 16 and 17 that are formed on the retaining ring 15. It can also be seen in FIG. 3 that the retaining ring 15 is slit at 20.

From FIG. 2, it can be seen that an annular groove 21 is formed in the housing part 7. The annular groove 21 serves to receive the retaining ring 15. In the assembly process, the retaining ring 15 is simply clipped into the annular groove 21. The clamp-like protrusions 16 and 17 that grip the lugs 18 and 19 then assure that the retaining ring 15 is held relative to the housing part 7.

Figure 4:
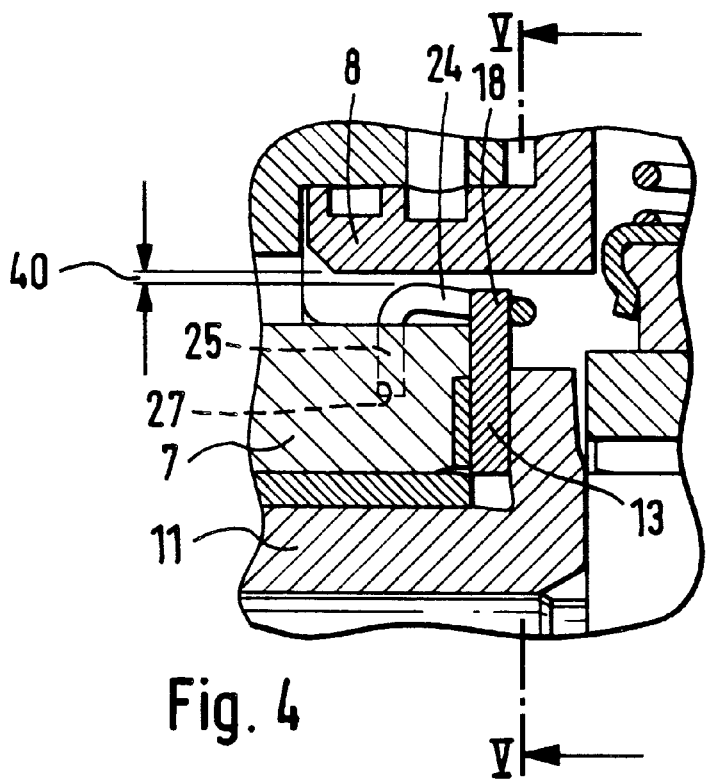
FIG. 4 shows an enlarged detail of FIG. 1 in accordance with a second embodiment of the present invention.

In the second embodiment of the invention, shown in FIG. 4, the axial bearing disk 13 is fixed with the aid of a clip 24. The ends 25 and 26 of the clip 24 are inserted into bores 27 and 28 that are made in the housing part 7. As best seen from the sectional view in FIG. 5, the clip 24 grips the lug 18 of the axial bearing disk 13. The number of lugs 18 and 19 of the axial bearing disk 13 is variable. However, there should be at least two lugs, to assure a secure hold of the axial bearing disk 13.

Figure 6:
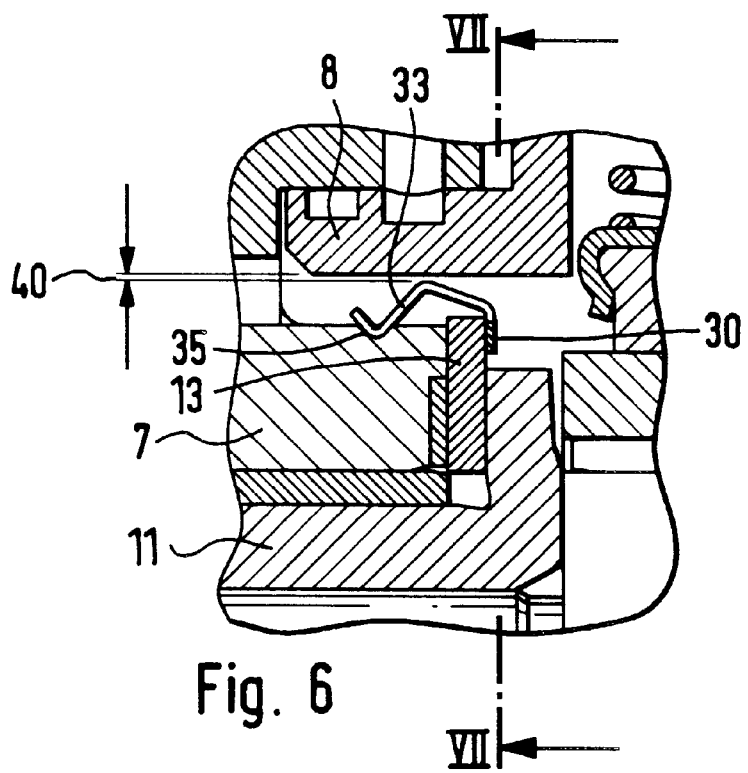
FIG. 6 shows an enlarged detail of FIG. 1 in accordance with a third embodiment of the present invention.
Figure 7:
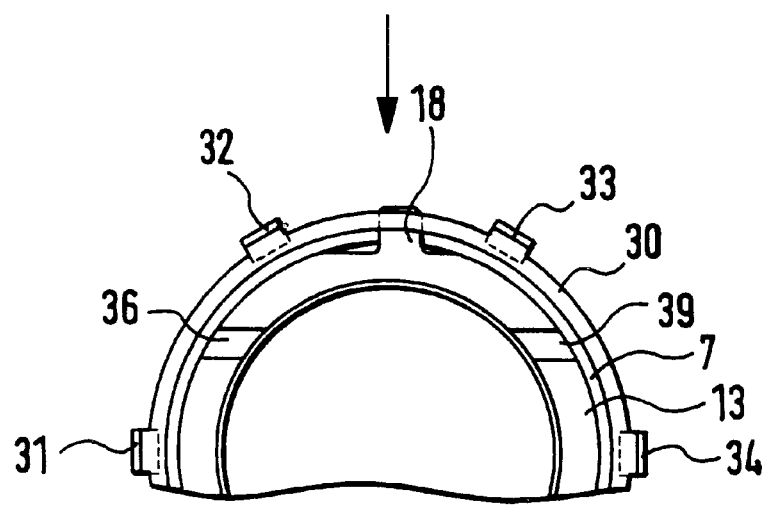
FIG. 7 shows a section taken along the line VII—VII in FIG. 6.

In the third embodiment of the invention, shown in FIGS. 6 and 7, the axial bearing disk 13 is held on the housing part 7 by a retaining disk 30. Here the axial bearing disk 13 is disposed between the housing part 7 and the retaining disk 30. A plurality of claws 31, 32, 33 and 34 are formed on the retaining disk 30. The claws 31 through 34 are bent away from the retaining disk 30. As seen in FIG. 6, the claw 33 engages an annular groove 35, which is formed in the housing part 7. The same is true for the other claws, which are distributed equally over the circumference of the retaining disk.

As seen from FIGS. 2, 4 and 6, the spacing 40 between the housing parts 7 and 8 is so slight that while mounting of the retaining devices is made possible, still loosening of the retaining devices in operation is prevented. The retaining devices shown in FIGS. 2 through 7 are formed of a flexible, elastic spring steel. Alternatively, plastics with the same properties may be used.

Figure 5:
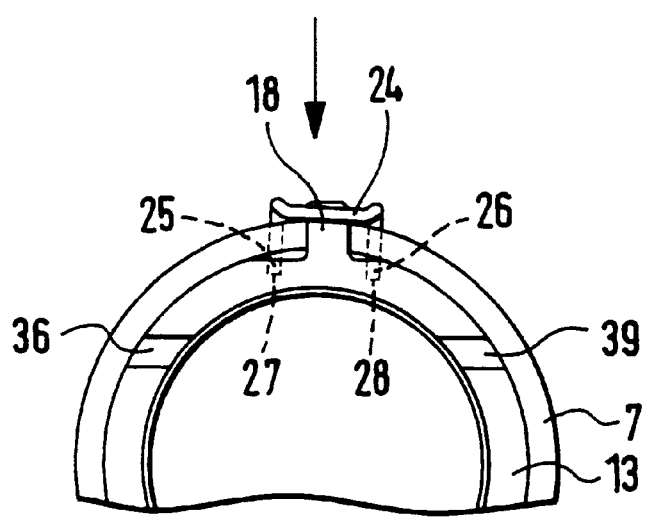
FIG. 5 shows of a section taken along the line V—V in FIG. 4.

As seen in FIGS. 3, 5 and 7, in the axial bearing disk 13 lubricating grooves 36, 37, 38 and 39 are formed, which assure the passage of lubricant from the bearing interior to the axial slide bearing surface.

Figure 8:
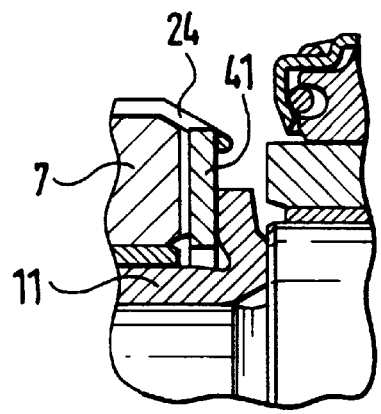
FIG. 8 shows a section in a version with a stop ring.

In the embodiment of the invention shown in FIG. 8, a stop ring 41 is used instead of an axial bearing disk. The stop ring 41 is held in position with the aid of a clip 24.

Figure 9:
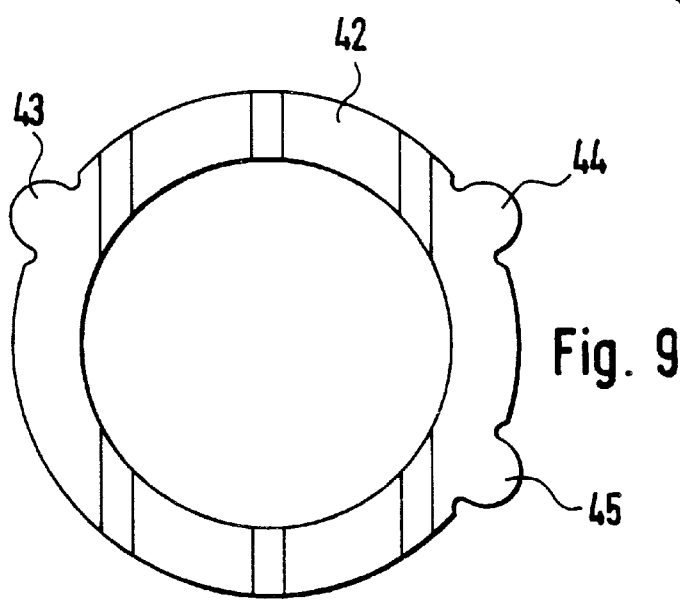
FIG. 9 shows a further embodiment of an axial bearing disk.

In FIG. 9, an axial bearing disk 42 is seen, on which three semicircular lugs 43, 44 and 45 are formed. The asymmetrical disposition of the lugs 43–45 assures that the axial bearing disk 42 cannot be installed the wrong way.

Figure 10:
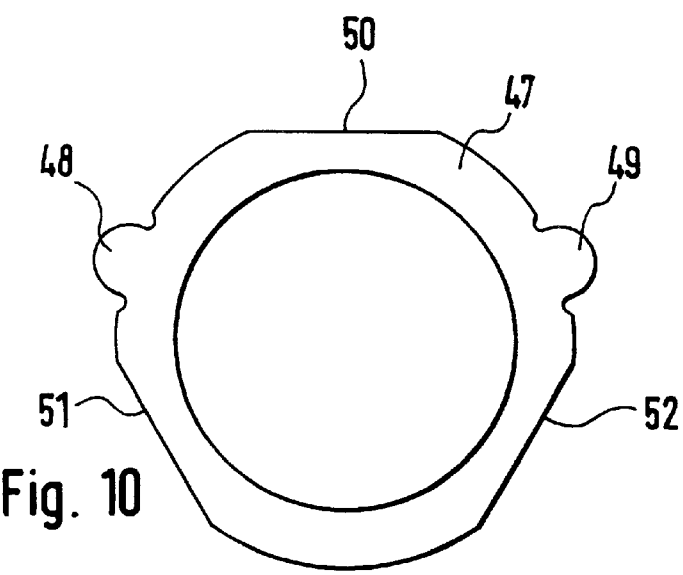
FIG. 10 shows an embodiment of a stop ring.

FIG. 10 shows the stop ring with two semicircular lugs 48 and 49. The correct installation of the stop ring 47 is assured by three flat faces 50, 51 and 52, together with the lugs 48 and 49.

The foregoing relates to a preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A radial piston pump for generating high-fuel pressure in fuel injection systems of internal combustion engines including a common rail injection system, comprising a drive shaft (2) which is supported in a pump housing (7, 8) and has an eccentrically embodied shaft portion (3), a plurality of pistons (4) are disposed radially in a respective element bore (5) and supported relative to the drive shaft (2), said pistons are moved back and forth in the respective element bore (5) by rotation of the drive shaft (2), an axial bearing disk (13) or a stop ring (41) with a plurality of radially extending lugs (18, 19) which are disposed on a circumference of said axial bearing disk (13) or said stop ring (41) which engage corresponding recesses in the pump housing (7) is mounted in the pump housing (7, 8) with the aid of a separate retaining device (15, 24, 30).

2. The radial piston pump according to claim 1, in which the retaining device (15, 24, 30) is formed of an elastic material.

3. The radial piston pump according to claim 2, in which a plurality of radially extending lubricating grooves (36, 39) are recessed in the axial bearing disk (13).

4. The radial piston pump according to claim 1, in which a plurality of radially extending lubricating grooves (36, 39) are recessed in the axial bearing disk (13).

5. The radial piston pump according to claim 1, in which an inside diameter of the pump housing (8) in a region of the retaining devices (15, 24, 30) is selected such that loosening of the retaining device (15, 24, 30) is prevented.

6. A radial piston pump for generating high-fuel pressure in fuel injection systems of internal combustion engines including a common rail injection system, comprising a drive shaft (2) which is supported in a pump housing (7, 8) and has an eccentrically embodied shaft portion (3), a plurality of pistons (4) are disposed radially in a respective element bore (5) and supported relative to the drive shaft (2), said pistons are moved back and forth in the respective element bore (5) by rotation of the drive shaft (2), an axial bearing disk (13) or a stop ring (41) with a plurality of lugs (18, 19) which are disposed on the circumference and engage corresponding recesses in the pump housing (7) is mounted in the pump housing (7, 8) with the aid of a retaining device (15, 24, 30), and an annular groove (21) is recessed in the pump housing (7) and serves to receive a retaining ring (15), said retaining device forms the retaining ring on which axially directed clamp-like protrusions (16, 17) are formed and which fit around the lugs (18, 19) on the axial bearing disk (13) or stop ring (41).

7. The radial piston pump according to claim 6, in which the retaining device (15, 24, 30) is formed of an elastic material.

8. The radial piston pump according to claim 6, in which a plurality of radially extending lubricating grooves (36, 39) are recessed in the axial bearing disk (13).

9. A radial piston pump for generating high-fuel pressure in fuel injection system of internal combustion engines including a common rail injection system, comprising a drive shaft (2) which is supported in a pump housing (7, 8) and has an eccentrically embodied shaft portion (3), a plurality of pistons (4) are disposed radially in a respective element bore (5) and supported relative to the drive shaft (2), said pistons are moved back and forth in the respective element bore (5) by rotation of the drive shaft (2), an axial bearing disk (13) or a stop ring (41) with a plurality of lugs (18, 19) which are disposed on the circumference and engage corresponding recesses in the pump housing (7) is mounted in the pump housing (7, 8) with the aid of a separate retaining device (15, 25, 30), and being inserted into corresponding bores (27, 28) in the pump housing (7).

10. The radial piston pump according to claim 9, in which the bent ends (25, 26) of the clips (24) have a different spacing from one another than the corresponding bores (27, 28) in the pump housing 11.

11. The radial piston pump according to claim 10, in which the retaining device (15, 24, 30) is formed of an elastic material.

12. The radial piston pump according to claim 10, in which a plurality of radially extending lubricating grooves (36, 39) are recessed in the axial bearing disk (13).

13. The radial piston pump according to claim 9, in which the retaining device (15, 24, 30) is formed of an elastic material.

14. The radial piston pump according to claim 9, in which a plurality of radially extending lubricating grooves (36, 39) are recessed in the axial bearing disk (13).

15. A radial piston pump for generating high-fuel pressure in fuel injection systems of internal combustion engines including a common rail injection system, comprising a drive shaft (2) which is supported in a pump housing (7, 8) and has an eccentrically embodied shaft portion (3), a plurality of pistons (4) are disposed radially in a respective element bore (5) and supported relative to the drive shaft (2), said pistons are moved back and forth in the respective element bore (5) by rotation of the drive shaft (2), an axial bearing disk (13) or a stop ring (41) with a plurality of lugs (18, 19) which are disposed on the circumference and engage corresponding recesses in the pump housing (7) is mounted in the pump housing (7, 8) with the aid of a retaining device (15, 24, 30), and the retaining device is formed by a retaining disk (30), and from a circumference of said retaining disk, a plurality of claws (31–34) are bent, said claws dig into the pump housing (7) when the axial bearing disk (13) is disposed between the retaining disk (30) and the pump housing (7).

16. The radial piston pump according to claim 15, in which an annular groove (35), which is engaged by the claws (31, 34) bent from the retaining disk (30), is embodied in the pump housing (7).

17. The radial piston pump according to claim 16, in which the retaining device (15, 24, 30) is formed of an elastic material.

18. The radial piston pump according to claim 16, in which a plurality of radially extending lubricating grooves (36, 39) are recessed in the axial bearing disk (13).

19. The radial piston pump according to claim 15, in which the retaining device (15, 24, 30) is formed of an elastic material.

20. The radial piston pump according to claim 15, in which a plurality of radially extending lubricating grooves (36, 39) are recessed in the axial bearing disk (13).

* * * * *